US006204080B1

United States Patent
Hwang

(10) Patent No.: US 6,204,080 B1
(45) Date of Patent: Mar. 20, 2001

(54) METHOD FOR MANUFACTURING THIN FILM ACTUATED MIRROR ARRAY IN AN OPTICAL PROJECTION SYSTEM

(75) Inventor: Kyu-Ho Hwang, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/050,910

(22) Filed: Mar. 31, 1998

(30) Foreign Application Priority Data

Oct. 31, 1997 (KR) ................................................ 97-57107
Oct. 31, 1997 (KR) ................................................ 97-57108

(51) Int. Cl.[7] ................................................ H01L 21/00
(52) U.S. Cl. ........................... 438/29; 356/224; 356/291; 356/850
(58) Field of Search ............................. 438/29; 359/224, 359/291, 850

(56) References Cited

U.S. PATENT DOCUMENTS

| 5,126,836 | 6/1992 | Um | 358/60 |
|---|---|---|---|
| 5,469,302 * | 11/1995 | Lim | 359/846 |
| 5,554,434 * | 9/1996 | Park et al. | 428/209 |
| 5,608,569 * | 3/1997 | Kim | 359/291 |
| 5,637,517 * | 6/1997 | Choi | 438/29 |
| 5,677,785 * | 10/1997 | Koo et al. | 359/291 |
| 5,757,539 | 5/1998 | Min | 359/290 |
| 5,786,928 * | 7/1998 | Nam et al. | 359/295 |
| 5,815,305 * | 9/1998 | Min et al. | 359/292 |
| 5,902,702 * | 5/1999 | Nakao et al. | 430/5 |
| 5,937,271 * | 8/1999 | Min | 438/30 |

FOREIGN PATENT DOCUMENTS 0 741 310    11/1996  (EP) .
WO 95/14351   5/1995  (WO) .

* cited by examiner

*Primary Examiner*—Matthew Smith
*Assistant Examiner*—Renzo Rocchegiani
(74) *Attorney, Agent, or Firm*—Pillsbury Winthrop LLP

(57) ABSTRACT

A method for manufacturing a thin film AMA is disclosed. The second sacrificial layer is formed by using amorphous silicon, poly silicon or a material having fluidity and the first sacrificial layer is formed by using amorphous silicon or poly silicon. The light efficiency is enhanced by the reflecting member having an even surface after the first and the second sacrificial layers are formed in order to have even surfaces. In addition, the active matrix, the active layer and the reflecting member have no damages because the second sacrificial layer is removed by using the oxygen plasma or the vapor of bromine fluoride or xenon fluoride and the first sacrificial layer is removed by using the vapor of bromine fluoride or xenon fluoride.

11 Claims, 14 Drawing Sheets

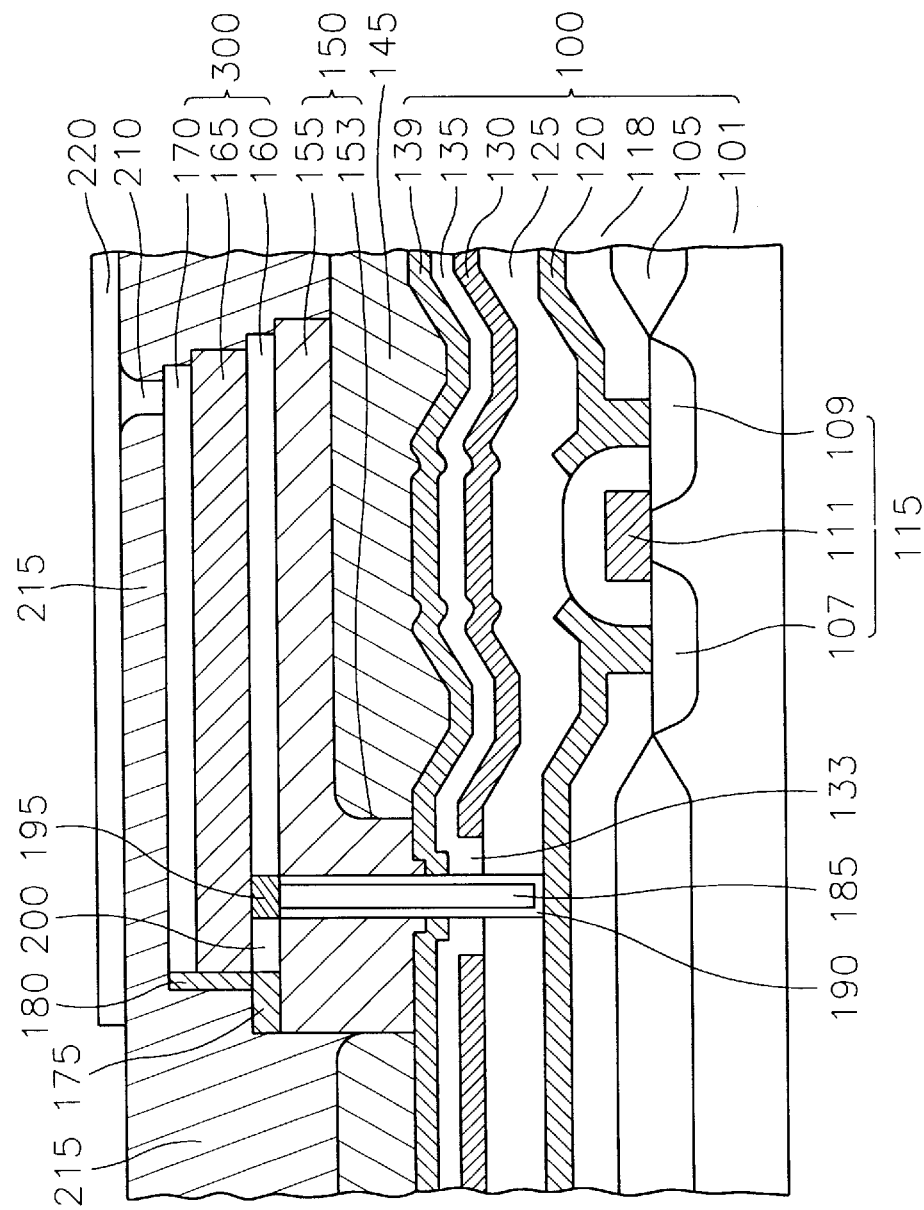

METHOD FOR MANUFACTURING THIN FILM ACTUATED MIRROR ARRAY IN AN OPTICAL PROJECTION SYSTEM

BACKGROUND OF THE INVENTION

Field of the Invention

The present invention relates to a method for manufacturing a thin film actuated mirror array in an optical projection system, and more particularly to a method for manufacturing a thin film actuated mirror array in an optical projection system for enhancing a light efficiency and for preventing damages of an active matrix, an actuator and a reflecting member.

In general, light modulators are divided into two groups according to their optics. One group is a direct light modulator such as a cathode ray tube (CRT), and the other group is a transmissive light modulator such as a liquid crystal display (LCD), a digital mirror device (DMD), and an actuated mirror array (AMA). The CRT projects a superior qualitative picture on a screen, but a weight, a volume, and a manufacturing cost of the CRT increase according to the magnification of the screen. The LCD has a simple optical structure, so a weight and a volume of the LCD are less than those of the CRT. However, the LCD has a poor light efficiency of under 1 to 2% due to light polarization. And, there are another problems in a liquid crystal material of the LCD such as sluggish response and overheating. Thus, the DMD and the AMA have been developed to solve these problems. Now, the DMD has a light efficiency of about 5% while the AMA has a light efficiency of above 10%. The AMA enhances a contrast of a picture projected on a screen, so the picture is more apparent and brighter. The AMA is not affected by the polarization of rays of incident light. Also, the AMA is not affected by the polarization of a reflected light. Therefore, the AMA is more efficient than the LCD or the DMD. FIG. 1 shows a schematic diagram for showing an engine system of a conventional AMA disclosed in U.S. Pat. No. 5,126,836 (issued to Gregory Um).

Referring to FIG. 1, a incident light from a light source 1 passes through a first slit 3 and a first lens 5 and is divided into red, green and blue lights according to the Red.Green.Blue (R.G.B) system of color representation. After the divided red, green, and blue lights are respectively reflected by a first mirror 7, and second mirror 9, and a third mirror 11, the reflected lights are respectively incident on AMA devices 13, 15, and 17 corresponding to the mirror 7, 9, and 11. The AMA devices 13, 15, and 17 respectively tilt the mirrors installed therein, so the rays of incident light are reflected by the mirrors. In this case, the mirrors installed in the AMA devices 13, 15, and 17 are tilted according to the deformation of active layers formed under the mirrors. The rays of reflected light by the AMA devices 13, 15, and 17 pass a second lens 19 and a second slit 21 and form a picture on a screen (not shown) by means of a projection lens 23.

In most case, zinc oxide (ZnO) is used as a material forming the active layer. However, lead zirconate titanate (PZT: $Pb(Zr, Ti)O_3$) has been found to have a better piezoelectric property than ZnO. PZT is a complete solid solution made of lead zirconate ($PbZrO_3$) and lead titanate ($PbTiO_3$). At a high temperature, PZT exists in a paraelectric phase whose crystal structure is a cubic. While at a room temperature, PZT exists in an antiferroelectric phase whose crystal structure is an orthorhombic, in a ferroelectric phase whose crystal structure is a rhombohedral, or in a ferroelectric phase whose crystal structure is a tetragonal according to the composition ratio of Zr to Ti.

The PZT has a morphotropic phase boundary (MPB) of the tetragonal phase and the rhombohedral phase where the composition ratio of Zr to Ti is 1:1. PZT has a maximum dielectric property and piezoelectric property at the MPB. The MPB does not lie in a specific composition ratio but lies over a relatively wide region where the tetragonal phase and the rhobohedral phase coexist. The phase coexistent region of PZT is reported differently depending on researchers. Various theories such as thermodynamic stability, compositional fluctuation, and internal stress have been suggested as the reason for the phase coexistent region. Nowadays, a PZT thin film can be manufactured by various processes such as a spin coating method, a chemical vapor deposition (CVD) method, or a sputtering method.

The AMA is generally divided into a bulk type AMA and a thin film type AMA. The bulk type AMA is disclosed in U.S. Pat. No. 5,469,302 (issued to Dae-Young Lim). The bulk type AMA is formed as follows. A ceramic wafer having a multilayer ceramic where metal electrodes are inserted is mounted on an active matrix having transistors. After sawing the ceramic wafer, a mirror is mounted on the ceramic wafer. However, the bulk type AMA has some disadvantages that very accurate process and design are required, and the response of an active layer is slow. Therefore, the thin film AMA that can be manufactured by using semiconductor manufacturing technology has been developed.

The thin film AMA is disclosed at U.S. Ser. No. 08/814,019 entitled "THIN FILM ACTUATED MIRROR ARRAY IN AN OPTICAL PROJECTION SYSTEM AND METHOD FOR MANUFACTURING THE SAME, which is now pending in USPTO and is subject to an obligation to the assignee of this application.

FIG. 2 is a plan view for showing a thin film actuated mirror array in an optical projection system disclosed in a prior application of the assignee of this application, FIG. 3 is a perspective view for showing the thin film actuated mirror array in an optical projection system in FIG. 2, and FIG. 4 is a cross-sectional view taken along the line $A_1$–$A_2$ of FIG. 3.

Referring to FIGS. 2 to 4, the thin film AMA has a substrate 50, an actuator 65 formed on the substrate 50 and a reflecting member 71 formed on the actuator 65.

The substrate 50 has an electrical wiring (not shown) for receiving a first signal from outside and transmitting the first signal, a connecting terminal 51 formed on the electrical wiring and connected to the electrical wiring, a passivation layer 52 formed on the electrical wiring and the connecting terminal 51, and an etching stop layer 53 formed on the passivation layer 51. The etching stop layer 53 protects the substrate 50 and the passivation layer 52 during successive etching process. Preferably, the electrical wiring has a metal oxide semiconductor (MOS) transistor (not shown) for switching operation.

The actuator 65 has a supporting layer 57, a bottom electrode 59 formed on the central portion of the supporting layer 57, an active layer 61 formed on the bottom electrode 59, a top electrode 63 formed on the active layer 61, a common line 67 formed on a portion of the supporting layer 57 and connected to the top electrode 63, and a post 70 formed on a portion of the top electrode 63. The supporting layer 57 has a first portion attached to the etching stop layer 53 having the connecting terminal 51 formed thereunder and a second portion formed parallel to the etching stop layer 53. An air gap 55 is interposed between the supporting layer 57 and the etching stop layer 53.

Referring to FIG. 4, the actuator 65 has a via contact 73 formed in the inside of a via hole 72 which is formed perpendicularly to the connecting terminal 51 from a portion of the supporting layer 57 having the connecting terminal 51 formed thereunder and a bottom electrode connecting member 75 formed from the via contact 73 to the bottom electrode 59. A first signal, a picture signal, is applied from outside to the bottom electrode 59 through the electrical wiring, the connecting terminal 51, the via contact 73, and the bottom electrode connecting member 75. At the same time, a second signal, a bias signal, is applied to the top electrode 63 from outside through the common line 67 so that the active layer 61 formed between the top electrode 63 and the bottom electrode 59 is deformed. Preferably, the supporting layer 57 has a T shape and the bottom electrode 59 having a rectangular shape is formed on the center portion of the supporting layer 57. The active layer 61 has a rectangular shape smaller than the bottom electrode 59 and the top electrode 63 also has a rectangular shape smaller than the active layer 61.

The reflecting member 71 for reflecting incident light is supported by the post 70 and is formed parallel above the top electrode 63. Preferably, the reflecting member 71 has a rectangular shape.

A method for manufacturing the thin film AMA disclosed in a prior application will be described below.

FIGS. 5A to 5D illustrate the manufacturing steps of the thin film AMA in an optical projection system illustrated in FIG. 4.

Referring to FIG. 5A, the substrate 50 having an electrical wiring (not shown) for receiving the first signal from outside and transmitting the first signal to the bottom electrode 59 and the connecting terminal 51 is provided. Preferably, the substrate 50 is composed of a semiconductor such as silicon (Si) and the electrical wiring has the MOS transistor (not shown) for switching operation.

The passivation layer 52 is formed on the substrate 50 and the connecting terminal 51. The passivation layer 52 is formed by chemical vapor deposition (CVD) method so that the passivation layer 52 has a thickness of between 0.1 $\mu$m and 1.0 $\mu$m. The passivation layer 52 is formed by using a phosphor silicate glass (PSG) and protects the substrate 50 having the electrical wiring and the connecting terminal 51 during successive manufacturing process.

An etching stop layer 53 is formed on the passivation layer 52. The etching stop layer 53 is formed by using nitride so that the etching stop layer 53 has a thickness of between 1000 Å and 2000 Å. The etching stop layer 53 is formed by low pressure chemical vapor deposition (LPCVD) method. The etching stop layer 53 protects the substrate 50 and the passivation layer 52 during the successive etching process.

A first sacrificial layer 54 is formed on the etching stop layer 53. The first sacrificial layer 54 enables the actuator 65 composed of the film layers to be easily formed. The first sacrificial layer 54 will be removed by using hydrogen fluoride (HF) vapor when the actuator 65 is completely formed. The first sacrificial layer 54 is formed by using PSG so that the first sacrificial layer 54 has a thickness of 0.5 $\mu$m and 2.0 $\mu$m. The first sacrificial layer 54 is formed by using atmospheric pressure CVD (APCVD) method. In this case, the degree of flatness of the first sacrificial layer 54 is poor because the first sacrificial layer 54 covers the surface of the substrate 50 having the electrical wiring and the connecting terminal 51. Therefore, the surface of the first sacrificial layer 54 is planarized by spin on glass (SOG) method or chemical mechanical polishing (CMP) method. Preferably, the surface of the first sacrificial layer 54 is planarized by the CMP method.

Then, the first sacrificial layer 54 is patterned so as to expose the portion of the etching stop layer 53 having the connecting terminal 51 formed thereunder. A first layer 56 is formed on the first sacrificial layer 54 and the exposed portion of the etching stop layer 53. The first layer 56 is formed by using a material such as nitride so that the first layer 56 has a thickness of between 0.1 $\mu$m and 1.0 $\mu$m. The first layer 56 is formed by LPCVD method. The first layer 56 will be patterned to form the supporting layer 57.

Referring to FIG. 5B, a first photo resist 58 is coated on the first layer 56 by spin coating method. Then, the first photo resist 58 is patterned to expose the central portion of the first layer 56 perpendicular to the exposed portion of the etching stop layer 53.

A bottom electrode layer is formed on the exposed portion of the first layer 56 and the first photo resist 58 by sputtering method. Then, the bottom electrode layer is patterned with respect to a position at which the common line 67 will be formed so that the bottom electrode 59 having the rectangular shape is formed on the central portion of the first layer 56. The bottom electrode 59 is formed by using a metal having conductivity such as platinum (Pt), tantalum (Ta) or platinum-tantalum (Pt—Ta) so that the bottom electrode 59 has a thickness of between 0.1 $\mu$m and 1.0 $\mu$m.

A second layer 60 is formed on the bottom electrode 59 and the first photo resist 58. The second layer 60 is formed by sol-gel method, sputtering method or CVD method so that the second layer 60 has a thickness of between 0.1 $\mu$m and 1.0 $\mu$m, preferably 0.4 $\mu$m. The second layer 60 is formed by using piezoelectric material such as barium titanic oxide ($BaTiO_3$), PZT ($Pb(Zr, Ti)O_3$) or PLZT (($Pb, La)(Zr, Ti)O_3$) or an electrostrictive material such as PMN ($Pb(Mg, Nb)O_3$). Successively, the second layer 60 is annealed by rapid thermal annealing (RTA) method. The second layer 60 will be patterned so as to form the active layer 61.

A top electrode layer 62 is formed on the second layer 61. The top electrode layer 62 is formed by using a material having conductivity such as aluminum (Al), platinum (Pt) or tantalum (Ta). The top electrode layer 62 is formed by sputtering method so that the top electrode layer 62 has a thickness of between 0.1 $\mu$m and 1.0 $\mu$m. The top electrode layer 62 will be patterned so as to form the top electrode 63.

Referring to FIG. 5C, after a second photo resist (not shown) is coated on the top electrode layer 62 by spin coating method, the top electrode layer 62 is patterned by using the second photo resist as an etching mask so that the top electrode 63 having the rectangular shape is formed. The second layer 60 is patterned by using the same method as that of patterning the top electrode layer 62 so that the active layer 61 is formed. That is, a third photo resist (not shown) is coated on the top electrode 63 and the second layer 60 by spin coating method after the second photo resist is removed by etching. The second layer 60 is patterned by using the third photo resist as an etching mask so that the active layer 61 having the rectangular shape wilder than that of the top electrode 63 is formed. At this time, the active layer 61 has the rectangular shape smaller than that of the bottom electrode 59 formed previously.

The first layer 56 is patterned by using the above-described method so as to form the supporting layer 57. The supporting layer 57 has the T shape. The bottom electrode 59 is formed on the central portion of the supporting layer 57. After the first photo resist 58 is removed, the common line 67 is formed on a portion of the supporting layer 57. Namely, after a fourth photo resist (not shown) is coated on the supporting layer 57 by spin coating method, the fourth photo resist is patterned to expose the portion of the supporting layer 57. Then, the common line 67 is formed by using a platinum (Pt), a tantalum (Ta), a platinum-tantalum (Pt—Ta), an aluminum (Al) or silver (Ag). The common line 67 is formed by using sputtering method or CVD method so that the common line 67 has a thickness of between 0.5 µm and 2.0 µm. In this case, the common line 67 is separated from the bottom electrode 59 by a predetermined distance and a portion of the common line 67 is connected to the top electrode 63.

A first portion of the supporting layer 57 having the connecting terminal 51 thereunder and a second portion of the supporting layer 57 which is adjacent to the first portion of the supporting layer 57 are simultaneously exposed when the fourth photo resist is patterned. Subsequently, the via hole 72 is formed by etching from the first portion of the supporting layer 57 to the connecting terminal 51 through the etching stop layer 53 and the passivation layer 52. The via contact 73 is formed in the inside of the via hole 72 from the connecting terminal 51 to supporting layer 57. At the same time, the bottom electrode connecting member 75 is formed for connecting the via contact 73 to the bottom electrode 29. Therefore, the via contact 73, the bottom electrode connecting member 75 and the bottom electrode 59 are connected one after another. The via contact 73 and the bottom electrode connecting member 75 are formed by using a material having conductivity such as a platinum (Pt), a tantalum (Ta) or a platinum-tantalum (Pt—Ta) by using sputtering method or CVD method. In this case, the bottom electrode connecting member 75 has a thickness of between 0.5 µm and 1.0 µm. The fourth photo resist is removed by etching, so that an actuator 65 having the top electrode 63, the active layer 61, the bottom electrode 59 and the supporting layer 57 is completed.

Referring to FIG. 5D, a second sacrificial layer 68 is formed on the actuator 65 by using a material having fluidity such as a polymer. The second sacrificial layer 68 is formed by using spin coating method so that the second sacrificial layer 68 completely covers the top electrode 63. Successively, the second sacrificial layer 68 is patterned so as to expose a portion of the top electrode 63. The post 70 and the reflecting member 71 is respectively formed on the exposed portion of the top electrode 63 and on the second sacrificial layer 68 by using a material having reflectivity such as an aluminum (Al), a platinum (Pt) or a silver (Ag). The post 70 and the reflecting member 71 is formed by sputtering method or CVD method. Preferably, the reflecting member 71 which reflects an incident light from a light source (not shown) is a mirror and has a thickness of between 0.1 µm and 1.0 µm. Consequently, after the first sacrificial layer 54 and the second sacrificial layer 68 are removed by using hydrogen fluoride (HF) vapor, the actuator 65 and the reflecting member 71 are completed as shown in FIG. 3.

In the above-described thin film AMA, the second signal is applied to the top electrode 63 via the common line 67. At the same time, the first signal is applied to the bottom electrode 59 via the electrical wiring formed on the substrate 50, the connecting terminal 51, the via contact 73 and the bottom electrode connecting member 75. Thus, an electric field is generated between the top electrode 63 and the bottom electrode 59. The active layer 61 formed between the top electrode 63 and the bottom electrode 59 is deformed by the electric field.

The active layer 61 is deformed in a direction perpendicular to the electric field. Hence, the actuator 65 having the active layer 61 is actuated upward by a predetermined tilting angle. The reflecting member 71 tilts by the same tilting angle of the actuator 65 because the reflecting member 71 is formed on the actuator 65 and is supported by the post 70. Therefore, the reflecting member 71 reflects the incident light by a predetermined angle, so the picture is projected onto a screen through a slit.

However, in the above-described thin film AMA, it is difficult that the second sacrificial layer composed of a polymer has an even surface. Thus, the surface of the reflecting member is irregular and the flatness of the reflecting member is poor because the reflecting member is formed on the second sacrificial layer which has the uneven surface so that the light efficiency may be decreased. In addition, during removing the first sacrificial layer and the second sacrificial layer by using the hydrogen fluoride vapor, the substrate, the active layer and the reflecting layer are damaged by the hydrogen fluoride vapor.

SUMMARY OF THE INVENTION

Therefore, the present invention is provided for solving the above-mentioned problems. It is an object of the present invention to provide a method for manufacturing a thin film actuated mirror array in an optical projection system which provides an improved flatness of a reflecting member in order to enhance a light efficiency and prevents damages of an active matrix, an active layer and the reflecting member.

To accomplish the above object in the present invention, there is provided a method for manufacturing a thin film actuated mirror array comprising the steps of:

providing an active matrix having i) a substrate including a metal oxide semiconductor therein for switching operation and ii) a first metal layer including a drain pad prolonged form a drain of the metal oxide transistor;

forming a first sacrificial layer on the active matrix by a low pressure chemical vapor deposition method;

forming a supporting member having an anchor and a supporting layer after patterning the first sacrificial layer to expose a portion of the active matrix having the drain pad;

forming an actuator on the supporting member, the actuator having a bottom electrode, an active layer and a top electrode;

forming a second sacrificial layer on the actuator;

patterning the second sacrificial layer to expose a portion of the top electrode;

forming a post and a reflecting member on the exposed portion of the top electrode and on the second sacrificial layer;

removing the second sacrificial layer; and removing the first sacrificial layer.

The step of providing the active matrix further has forming a first passivation layer on the substrate and on the first metal layer, forming a second metal layer on the first passivation layer, forming a second passivation layer on the second metal layer, and forming an etching stop layer on the second passivation layer.

Preferably, the steps of removing the second sacrificial layer and removing the second sacrificial layer are simultaneously performed.

The steps of forming the first sacrificial layer and forming the second sacrificial layer are performed by using amorphous silicon.

Also, the steps of forming the first sacrificial layer and the second sacrificial layer are performed by using poly silicon.

In this case, the steps of forming the first sacrificial layer and forming the second sacrificial layer further have planarizing the first sacrificial layer and the second sacrificial layer by chemical mechanical polishing method.

The steps of removing the second sacrificial layer and removing the first sacrificial layer are performed by using bromine fluoride vapor or xenon fluoride vapor.

Also, the step of forming the second sacrificial layer is performed by using a material having fluidity such as photo resist, spin on glass (SOG) or spin on polymer (SOP) and by spin coating method. In this case, the step of removing the second sacrificial layer is performed by using oxygen plasma and the step of removing the first sacrificial layer is performed by using bromine fluoride vapor or xenon fluoride vapor.

In the thin film AMA according to the present invention, the first signal is applied from outside to the first bottom electrode via the MOS transistor, the drain pad of the first metal layer, the via contact and the bottom electrode connecting member. At the same time, when the second signal is applied from outside to the top electrode via the common line and the top electrode connecting member, an electric field is generated between the top electrode and the bottom electrode The active layer formed between the top electrode and the bottom electrode is deformed by the electric field. The active layer is deformed in the direction perpendicular to the electric field. Hence, the actuator having the active layer is actuated in the opponent direction to the position where the supporting layer is located. That is, the actuator is actuated upward by a predetermined angle. The reflecting member reflecting the light is tilted by the same angle of the actuator. Therefore, the reflecting member reflects the light onto a screen, so the picture is projected on the screen.

According to the present invention, the light efficiency is enhanced by the reflecting member having an even surface after the first sacrificial layer is formed by amorphous silicon or poly silicon and the second sacrificial layer is formed by using amorphous silicon, poly silicon, photo resist, spin on glass or spin on polymer in order to have even surfaces. In addition, the active matrix, the active layer and the reflecting member have no damages because the first sacrificial layer is removed by using bromine fluoride vapor or xenon fluoride vapor and the second sacrificial layer is removed by using oxygen plasma, bromine fluoride vapor or xenon fluoride vapor.

BRIEF DESCRIPTION OF THE DRAWINGS

The above object, features and advantages of the present invention will become more apparent from reading the following detailed description of the invention taken in connection with the accompanying drawings, wherein:

FIGS. 9A to 9D illustrate the manufacturing steps of the thin film actuated mirror array in an optical projection system according to the first embodiment of the present invention.

DESCRIPTION OF THE PREFERRED EMBODIMENT

Hereinafter, the preferred embodiments of the present invention will be explained in more detail with reference to the accompanying drawings.

Embodiment 1

Figure 1:
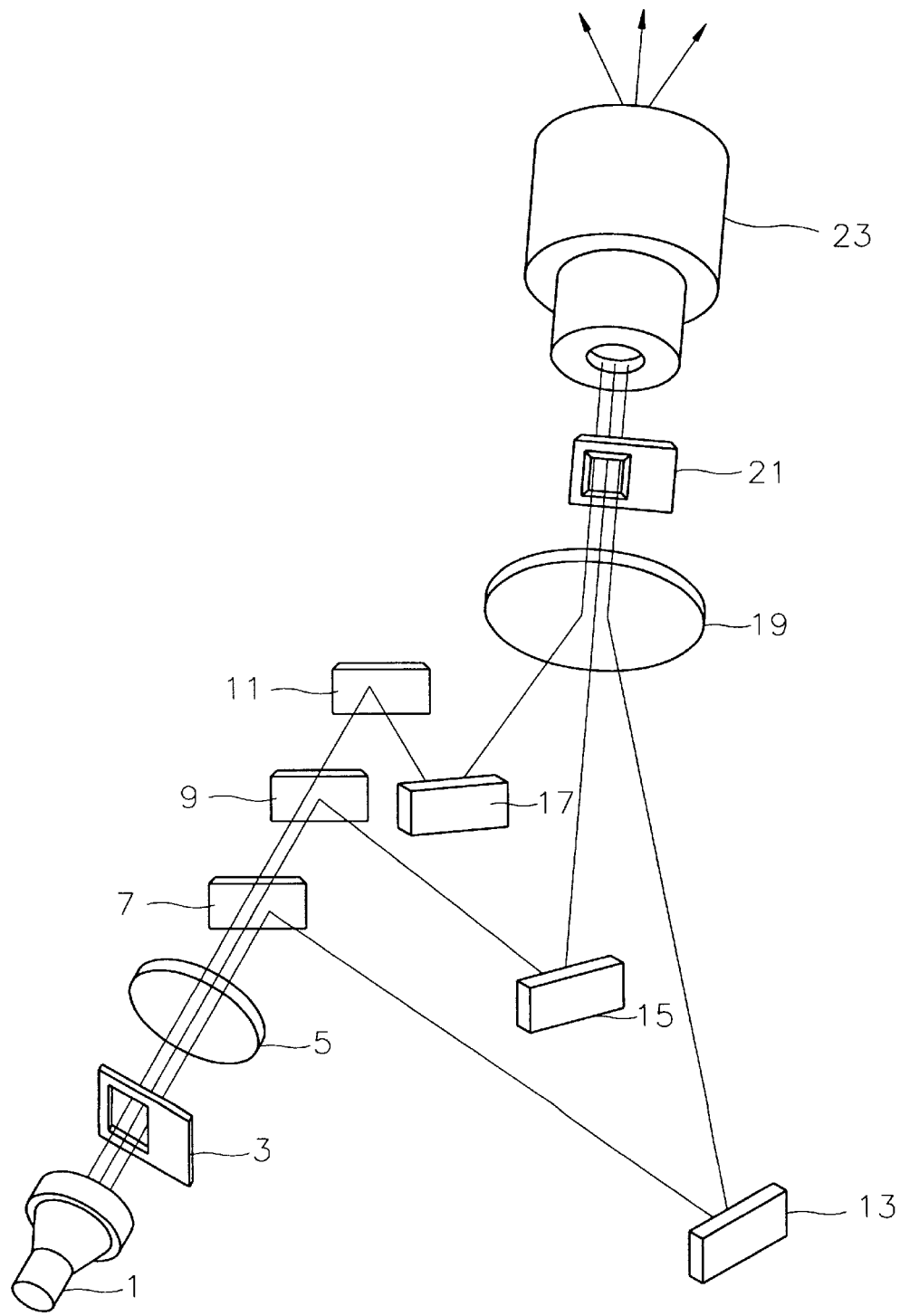
FIG. 1 is a schematic view for showing an engine system of a conventional actuated mirror array.
Figure 2:
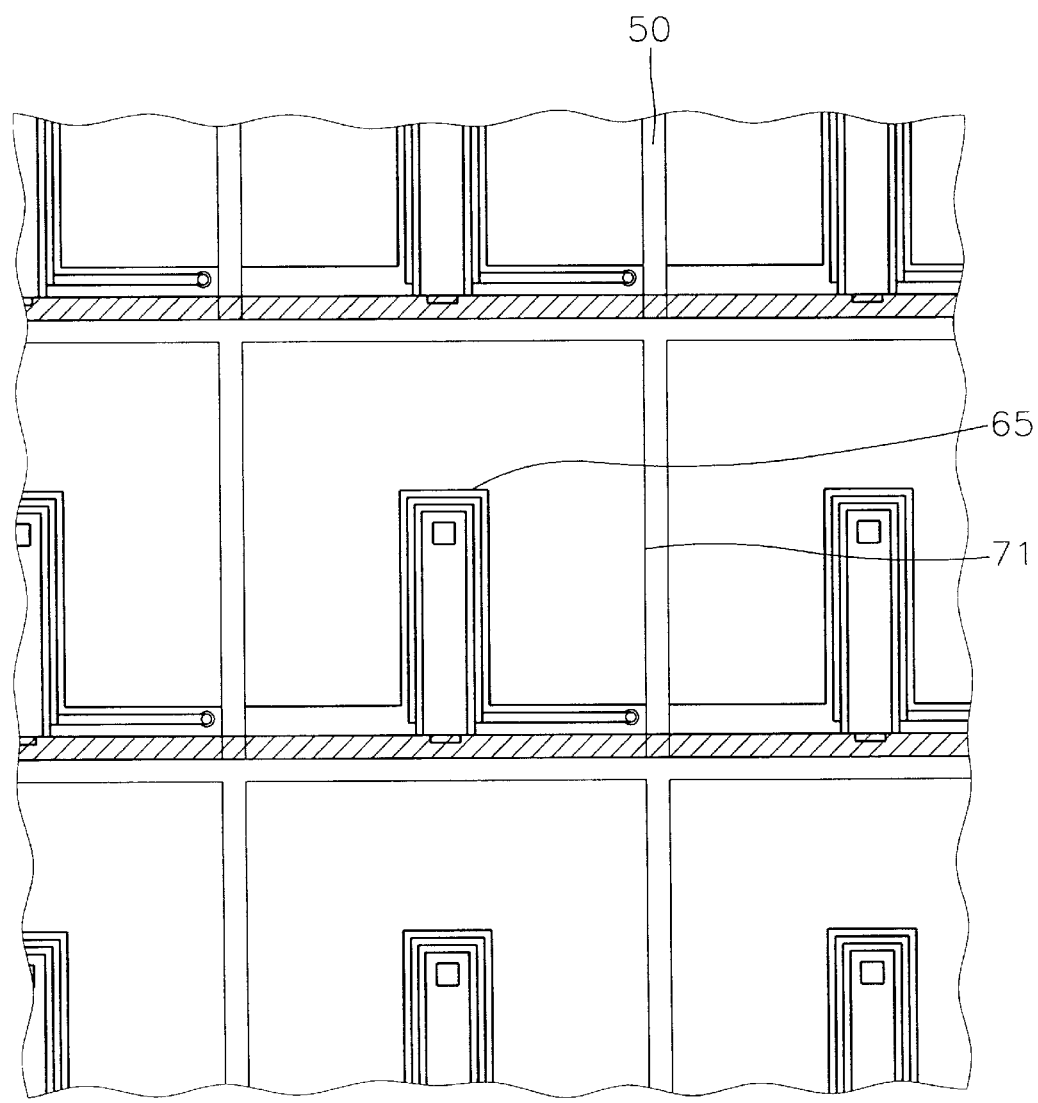
FIG. 2 is a plan view for showing a thin film actuated mirror array in an optical projection system disclosed in a prior application of the assignee of this application.
Figure 3:
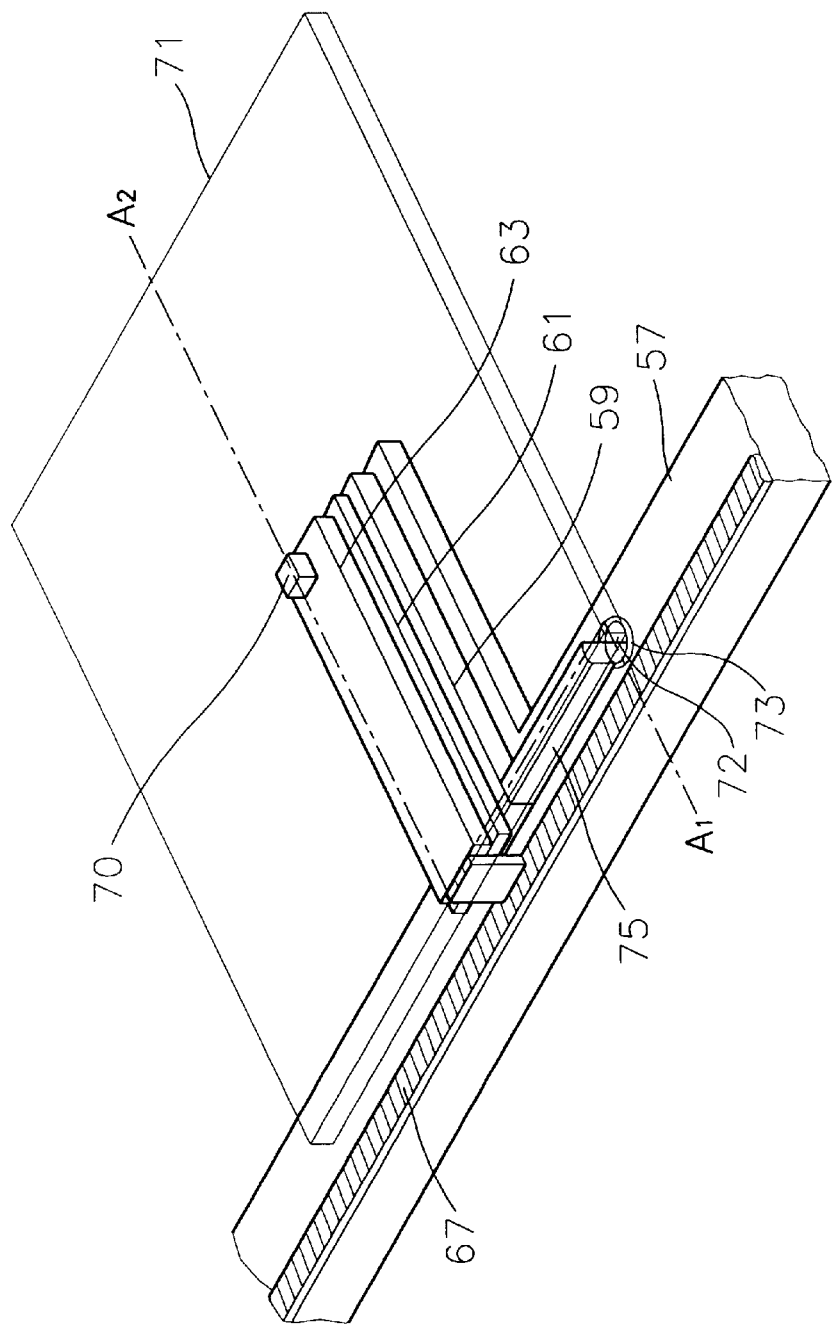
FIG. 3 is a perspective view for showing the thin film actuated mirror array in an optical projection system in FIG. 2.
Figure 4:
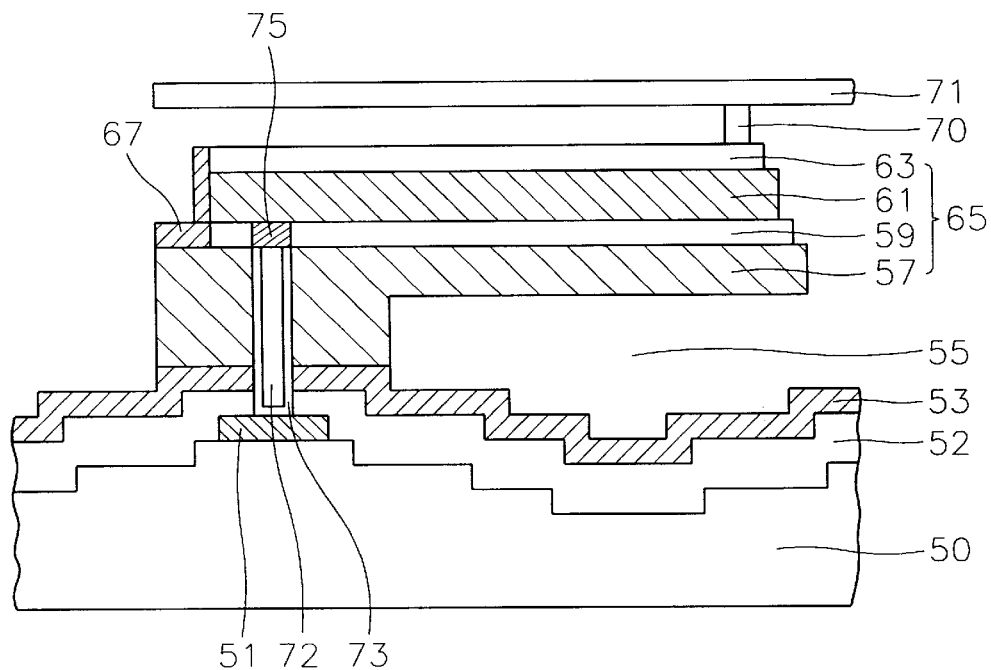
FIG. 4 is a cross-sectional view taken along the line $A_1$–$A_2$ of FIG. 3.
Figure 5A:
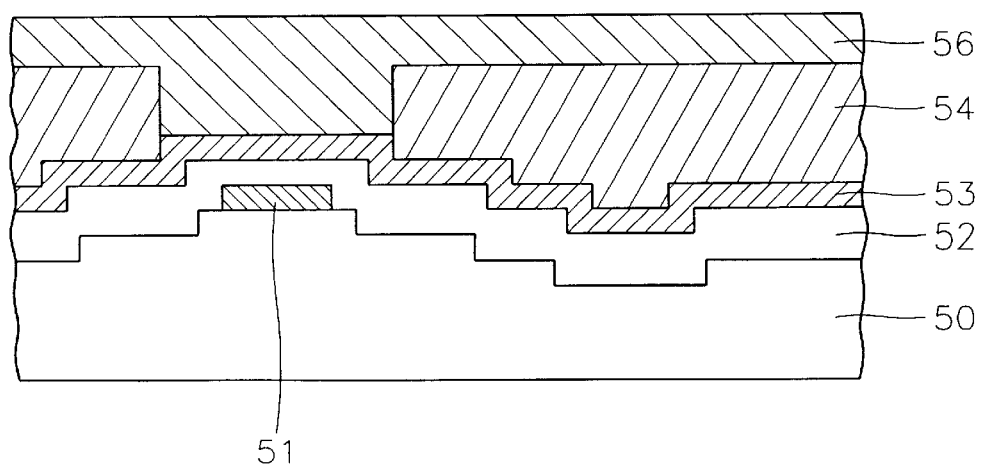
FIGS. 5A to 5D illustrate the manufacturing steps of the thin film actuated mirror array in an optical projection system illustrated in FIG. 4.
Figure 5B:
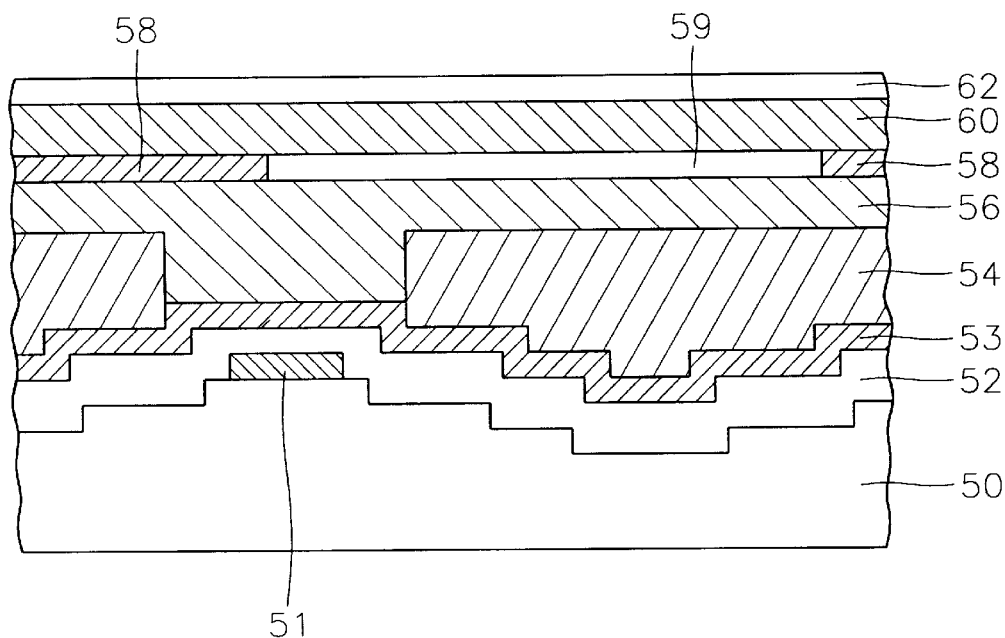
Figure 5C:
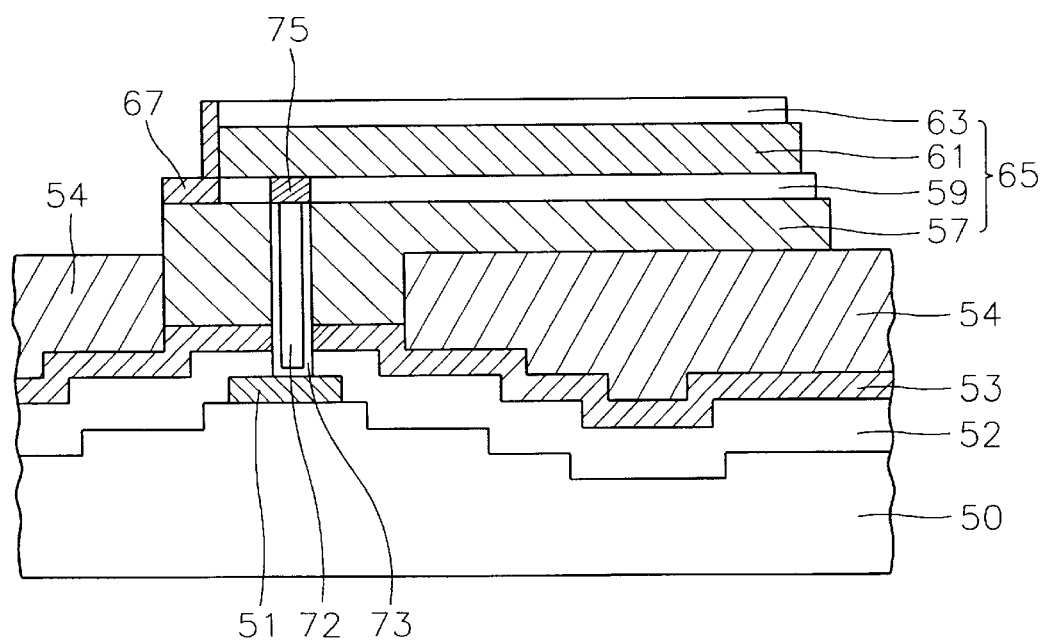
Figure 5D:
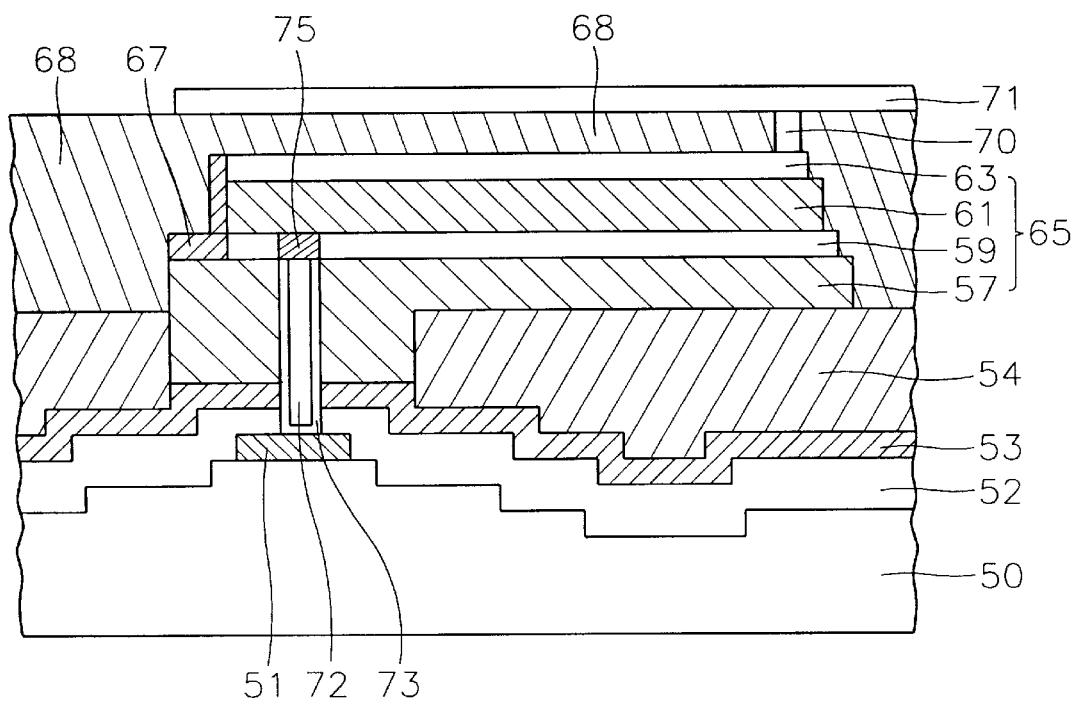
Figure 6:
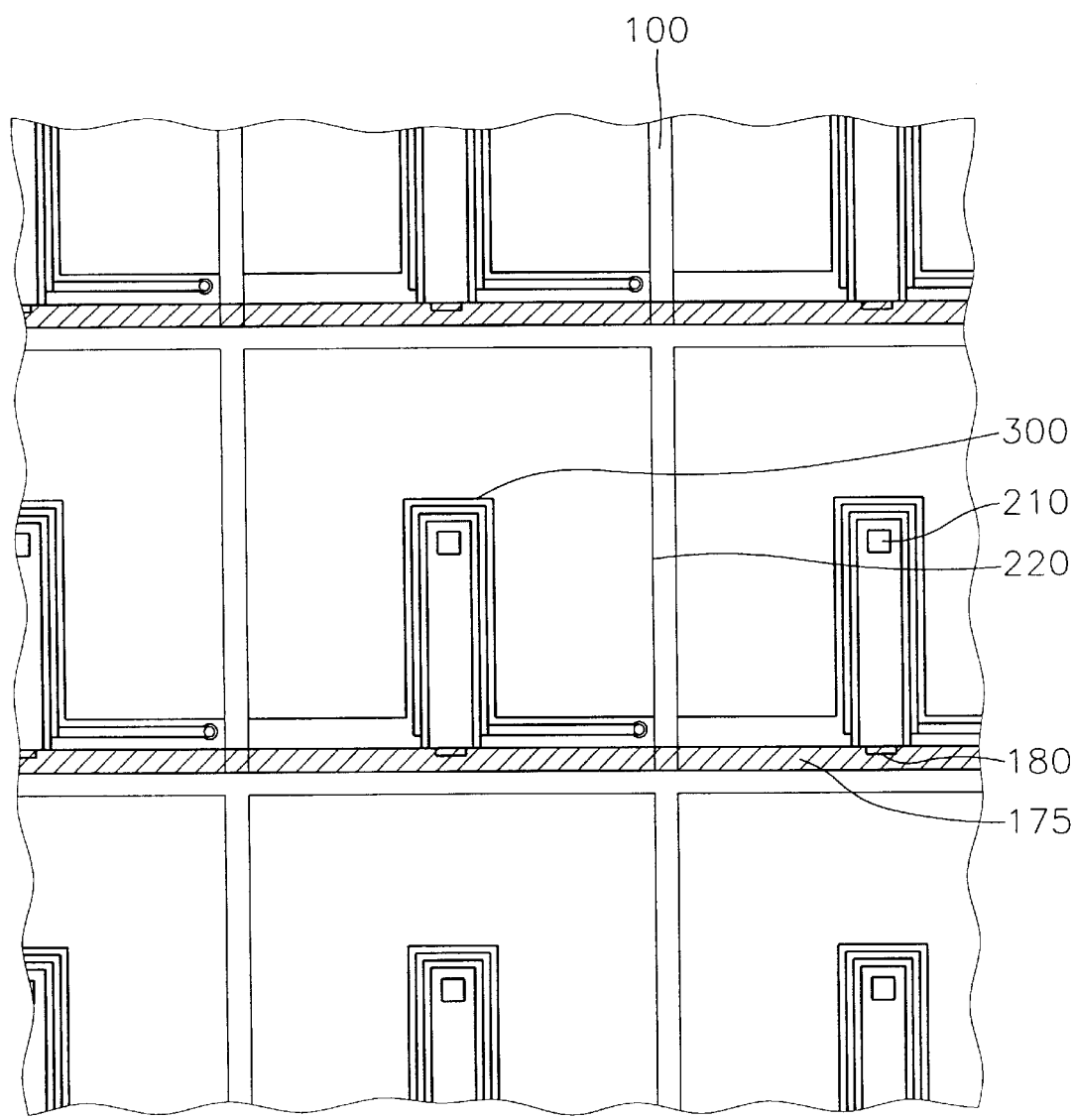
FIG. 6 is a plan view for showing a thin film actuated mirror array in an optical projection system according to the first embodiment of the present invention.
Figure 7:
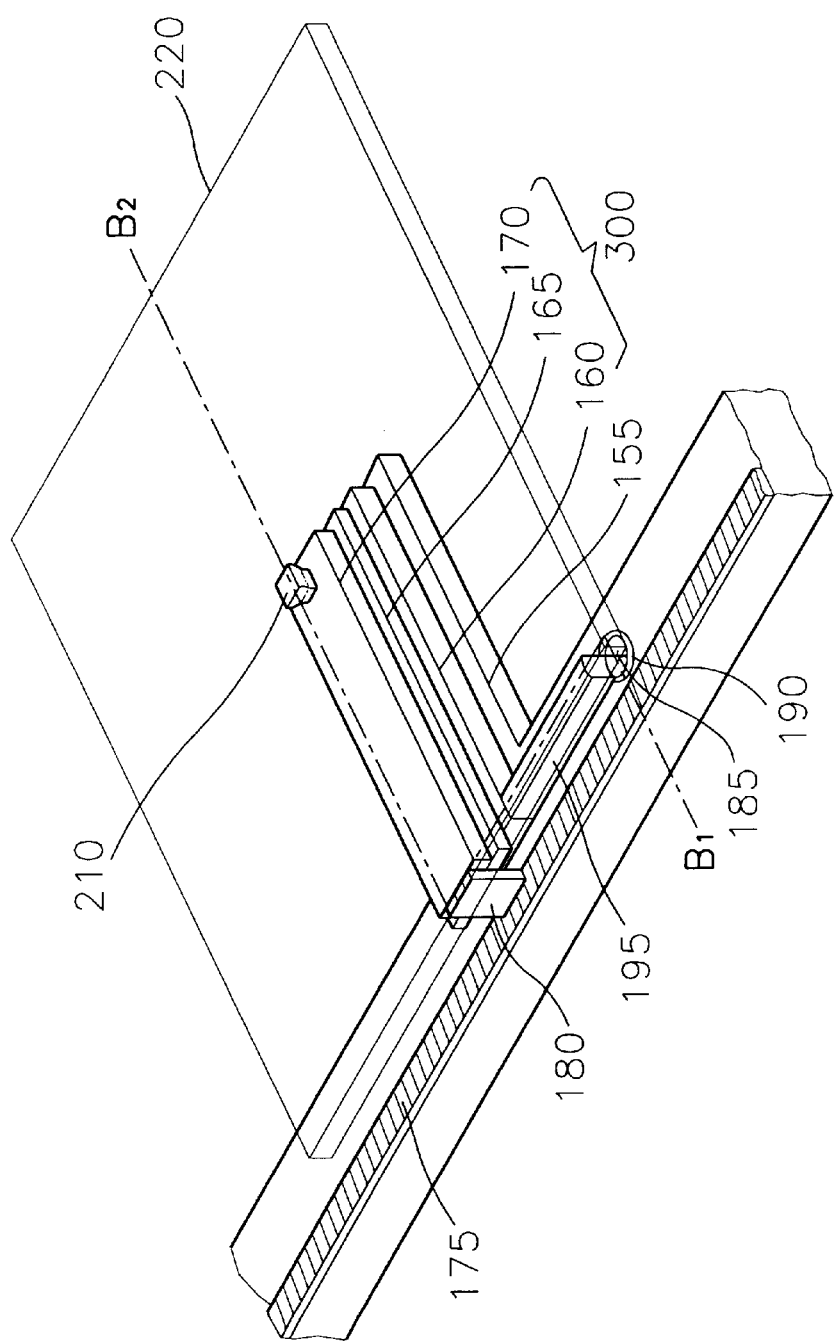
FIG. 7 is a perspective view for showing the thin film actuated mirror array in an optical projection system in FIG. 6.
Figure 8:
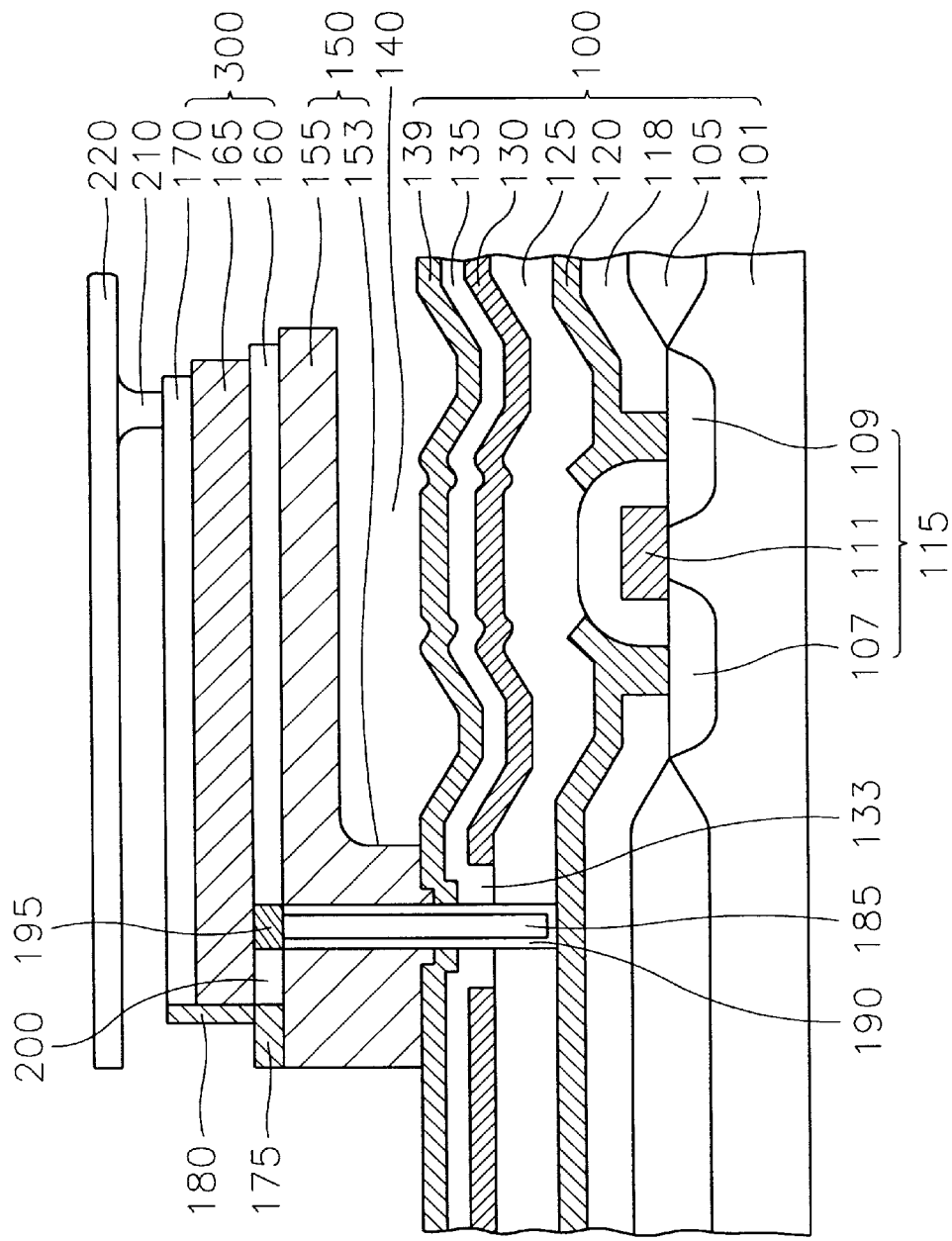
FIG. 8 is a cross-sectional view taken along the line $B_1$–$B_2$ of FIG. 7.

FIG. 6 is a plan view for showing a thin film actuated mirror array in an optical projection system according to a first embodiment of the present invention, FIG. 7 is a perspective view for showing the thin film actuated mirror array in an optical projection system in FIG. 6 and FIG. 8 is a cross-sectional view taken along the line $B_1$–$B_2$ of FIG. 7.

Referring to FIGS. 6 to 8, the thin film AMA according to the first embodiment of the present invention has an active matrix 100, a supporting member 150 formed on the active matrix 100, an actuator 300 formed on the supporting member 150 and a reflecting member 220 formed on the actuator 300.

Referring to FIG. 8, the active matrix 100 has a substrate 101 including M×N (M, N are integers) numbers of P-typed metal oxide semiconductor (MOS) transistors 115, a first metal layer 120 formed on the substrate 101, a first passivation layer 125 formed on the first metal layer 120, a second metal layer 130 formed on the first passivation layer 125, a second passivation layer 135 formed on the second metal layer 130, and an etching stop layer 139 formed on the second passivation layer 135.

The first metal layer 120 has a drain pad in order to transmit a first signal (a picture signal). The drain pad of the first metal layer 120 is prolonged from a drain 107 of the P-type MOS transistor 115 to a portion of the substrate 101 under an anchor 153 which supports the actuator 300. The second metal layer 130 has a titanium layer and a titanium nitride layer. A hole 133 is formed through a portion of the second metal layer 130 having the drain pad formed thereunder.

Referring FIGS. 7 and 8, the supporting member 150 has the anchor 153 and a supporting layer 155. The anchor 153 is attached to a portion of the etching stop layer 139 having the drain pad formed thereunder. A first portion of the supporting layer 155 is attached to the anchor 153 and a second portion of the supporting layer 155 is parallely formed above the etching stop layer 139. A first air gap 140 is interposed between the second portion of the supporting layer 155 and the etching stop layer 139. The anchor 153 and the supporting layer 155 are integrally formed. Preferably, the supporting member 150 has a T shape as shown in FIG. 7.

The actuator 300 has a bottom electrode 160 formed on a central portion of the supporting layer 155, an active layer 165 formed on the bottom electrode 160, a top electrode 170 formed on the active layer 165 and a common line 175 formed on a portion of the first portion of the supporting layer 155.

Also, the actuator 300 has a via contact 190 formed in a inside of a via hole 185 which is formed from a portion of the first portion of the supporting layer 155 to the drain pad, a bottom electrode connecting member 195 formed from the via contact 190 to the bottom electrode 160, and a top electrode connecting member 180 formed from the common line 175 to the top electrode 170. The first signal is applied from outside to the bottom electrode 160 through the MOS transistor 115, the drain pad, the via contact 190 and the bottom electrode connecting member 195. At the same time, a second signal (a bias signal) is applied from outside to the top electrode 170 through the common line 175 and the top electrode connecting member 180. Preferably, the bottom electrode 160 has a rectangular shape and the active layer 165 has a rectangular shape smaller than the bottom electrode 160. Also, the top electrode 170 has a rectangular shape smaller than the active layer 165.

The reflecting member 220 for reflecting an incident light from a light source (not shown) is supported by a post 210. The reflecting member 220 is parallely formed above the top electrode 170. Preferably, the reflecting member 220 is a rectangular-shaped mirror.

A method for manufacturing the thin film AMA according to the present embodiment will be described as follows.

FIGS. 9A to 9D illustrate the manufacturing steps of the thin film actuated mirror array according to the present embodiment. In FIGS. 9A to 9D, the same reference numerals are used for the same elements in FIGS. 7 and 8.

Figure 9A:
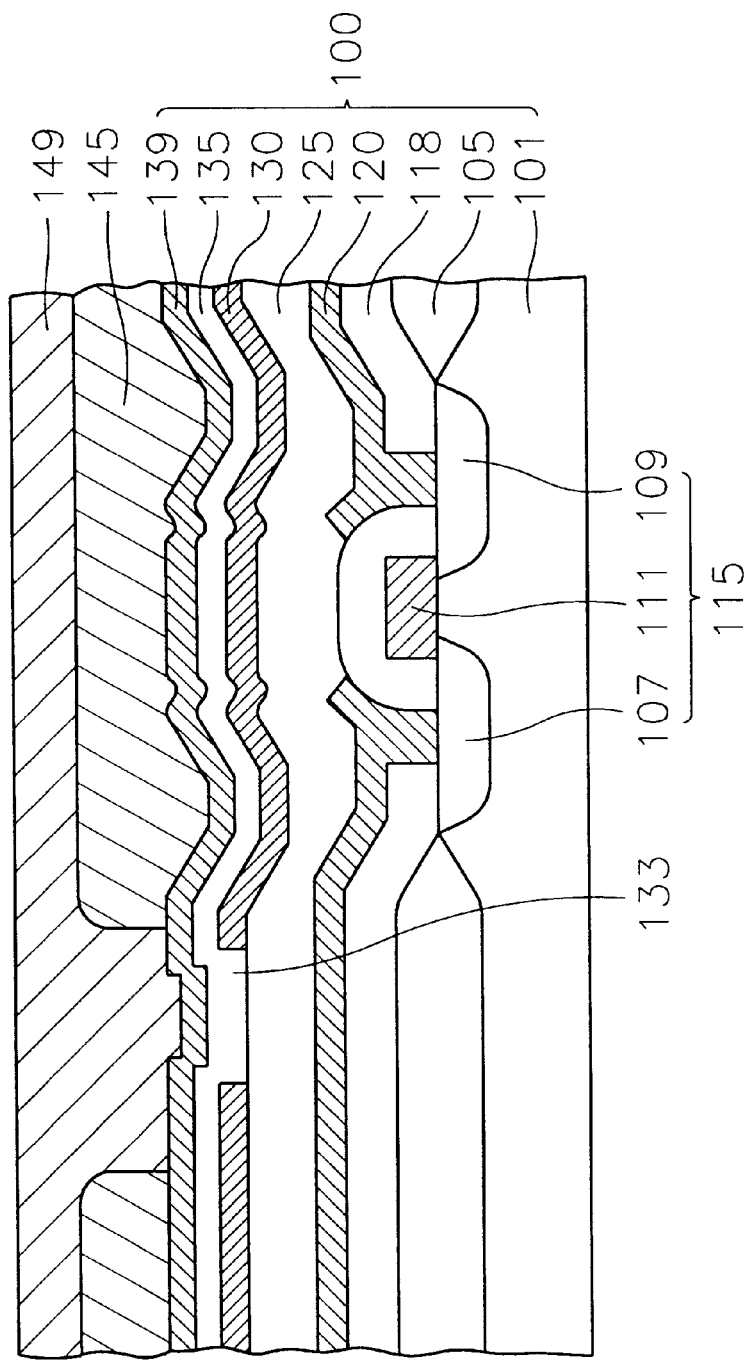

Referring to FIG. 9A, an isolating layer 105 is formed on the substrate 101 in order to separate an active region and a field region in the substrate 101 by local oxidation of silicon method after the substrate 101 composed of silicon is provided. Preferably, the substrate 101 is an N-typed silicon wafer. Subsequently, M×N (M, N are integers) numbers of P-typed MOS transistors 115 are completed according as the P⁺ source 109 and the P⁺ drain 107 are formed on the active region after a gate 111 is formed between the source 109 and the drain 107. The P-MOS transistor 115 receives the first signal from outside and performs a switching operation.

After an insulating layer 118 is formed on the substrate 101 having the P-MOS transistor 115 formed therein, openings are respectively formed at portions of the insulating layer 118 having drain 107 and the source 109 formed thereunder so as to expose the portions of the drain 107 and the source 109. After a layer composed of titanium (Ti), titanium nitride (TiN), tungsten (W) and nitride is formed on the insulating layer 118 having the openings, the layer is patterned to form the first metal layer 120. To transmit the first signal, the first metal layer 120 has a drain pad prolonged from the drain 107 of the P-MOS transistor 115 to the portion of the substrate 101 under the anchor 153.

The first passivation layer 125 is formed on the first metal layer 120 and on the substrate 101. The first passivation layer 125 is formed by using phosphor-silicate glass (PSG). The first passivation layer 125 is formed by CVD method so that the first passivation layer 125 has a thickness of between about 8000 Å and 9000 Å. The first passivation layer 125 protects the substrate 101 having the P-MOS transistor 115 during subsequent manufacturing steps.

The second metal layer 130 is formed on the first passivation layer 125. The second metal layer 130 is composed of the titanium layer and the titanium nitride layer. For forming the second metal layer 130, at first, the titanium layer is formed on the first passivation layer 125 by sputtering method so that the titanium layer has a thickness of between about 300 Å and 500 Å. Next, the titanium nitride layer is formed on the titanium layer by physical vapor deposition (PVD) method so that the titanium nitride layer has a thickness of between about 1000 Å and 1200 Å. The second metal layer 130 excludes the light incident upon the substrate 101, so the second metal layer 130 prevents a photo leakage current from flowing through the substrate 101. Then, a portion of the second metal layer 130 having the drain pad formed thereunder is etched so as to form the hole 133. The hole 133 isolates the via contact 190 from the second metal layer 130.

The second passivation layer 135 is formed on the second metal layer 130 and on the hole 133. The second passivation layer 135 is formed by using PSG. The second passivation layer 135 is formed by CVD method so that the second passivation layer 135 has a thickness of between about 2000 Å and 3000 Å. The second passivation layer 135 protects the second metal layer 130 and the resultant layers formed on the substrate 101 during subsequent manufacturing steps.

The etching stop layer 139 is formed on the second passivation layer 135. The etching stop layer 139 is formed by using nitride and by LPCVD method so that the etching stop layer 139 has a thickness of between about 1000 Å and 2000 Å. The etching stop layer 139 prevents the second passivation layer 135 and the resultant layers formed on the substrate 101 from being etched during etching process. As a result, the active matrix 100 is completed, which is composed of the substrate 101, the first metal layer 120, the first passivation layer 125, the second metal layer 130, the second passivation layer 135 and the etching stop layer 139.

A first sacrificial layer 145 is formed on the etching stop layer 139. The first sacrificial layer 145 enables the actuator 300 composed of multi-layers to be easily formed. In the present embodiment, the first sacrificial layer 145 is formed by using amorphous silicon or poly silicon and by LPCVD method at a temperature of below 600° C. In the case of forming the first sacrificial layer 145 by using the amorphous silicon, there is no need to planarize the surface of the first sacrificial layer 145 because the amorphous silicon has an even surface during depositing the amorphous silicon. Hence, after the amorphous silicon is deposited by the LPCVD method to have a thickness of about 1.0 μm, the step of forming the first sacrificial layer 145 is completed. On the other hand, the poly silicon has an irregular surface. Thus, in the case of forming the first sacrificial layer 145 by using the poly silicon, a step of planarizing the surface of the first sacrificial layer 145 is needed. That is, after the poly silicon is deposited by the LPCVD method to have a thickness of between about 2.0 μm and 3.0 μm, the first sacrificial layer 145 is planarized by using spin on glass or chemical mechanical polishing (CMP) method so that the first sacrificial layer 145 has a thickness of about 1.0 μm.

After a first photo resist (not shown) is coated on the first sacrificial layer 145 and is patterned, a portion of the first sacrificial layer 145 having the hole 133 of the second metal layer 130 and the drain pad thereunder is etched by using the first photo resist as an etching mask so that a portion of the etching stop layer 139 is exposed. The anchor 153 will be formed at the exposed portion of the etching stop layer 139. In this case, the portion of the first sacrificial layer 145 is patterned so that the edge of the pattern of the first sacrificial layer 145 has a gentle gradient for preventing the initial tilting of the actuator 300 due to the concentration of deformation stress at the edge of the first sacrificial layer 145 pattern. The gentle edge of the first sacrificial layer 145 pattern is formed by a method of using a dry etching and a wet etching in order, a method of using a gray mask or a method of reflowing the first photo resist.

Subsequently, the first layer 149 is formed on the exposed etching stop layer 139 and on the first sacrificial layer 145. The first layer 149 is formed by using rigid material such as nitride or metal so that the first layer 149 has a thickness of between about 0.1 μm and 1.0 μm. Preferably, the first layer 149 a thickness of about 0.4 μm. The first layer 149 is formed by LPCVD method. In this case, a portion of the first layer 149 attached to the etching stop layer 139 will be the anchor 153 which supports the actuator 300. The first layer 149 will be patterned so as to form the supporting member 150 having the T shape.

Figure 9B:
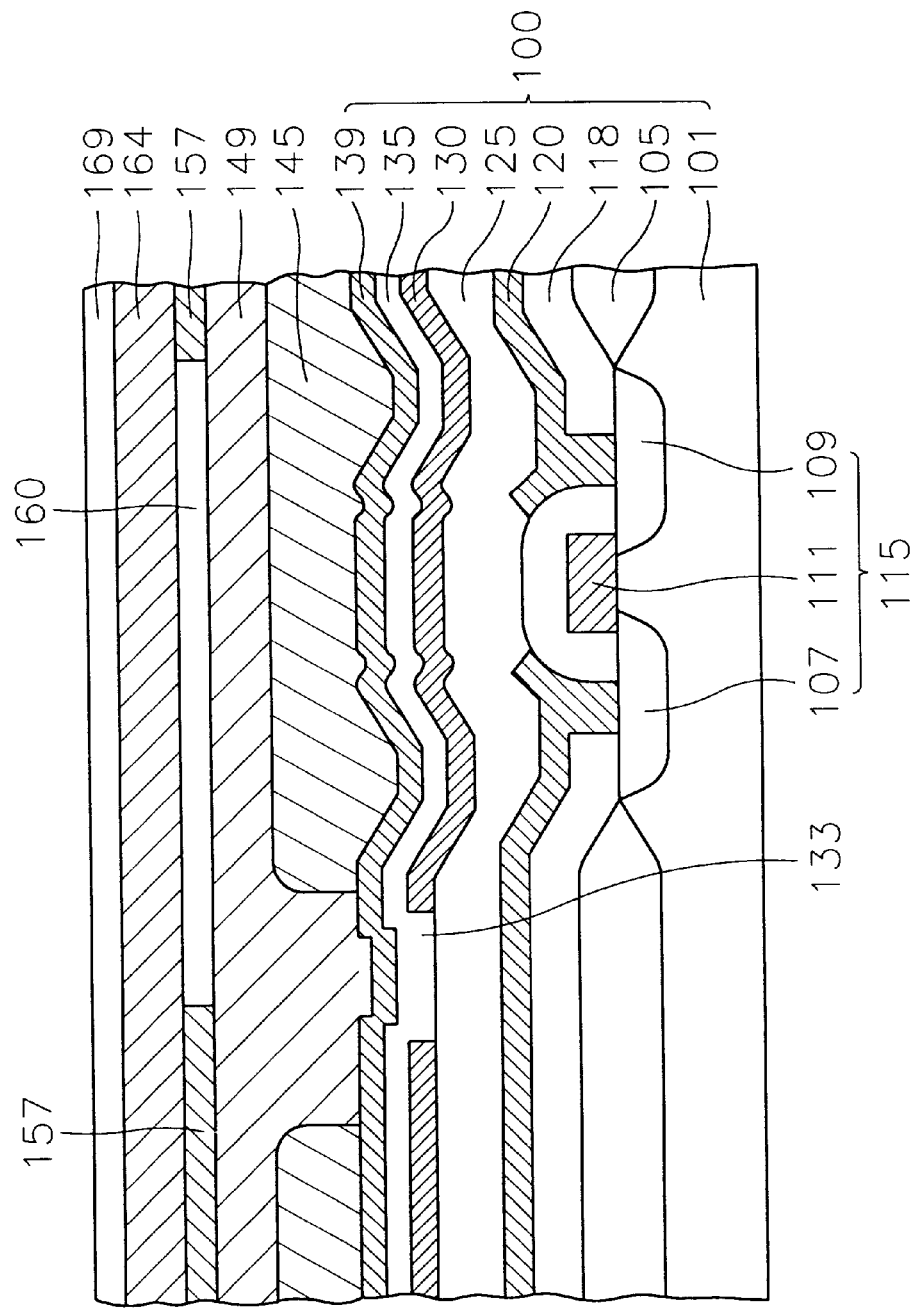

Referring to FIG. 9B, after a second photo resist 157 is formed on the first layer 149 by spin coating method, the second photo resist 157 is patterned so as to expose a central portion of the first layer 149 which is perpendicular to the exposed portion of the etching stop layer 139.

A bottom electrode layer is formed on the exposed portion of the first layer 149 and the second photo resist 157 by CVD method or sputtering method. Then, the bottom electrode layer is patterned with respect to a position at which the common line 175 will be formed so that the bottom electrode 160 having the rectangular shape is formed on the central portion of the first layer 149. The bottom electrode 160 is formed by using a metal having conductivity such as platinum, tantalum or platinum-tantalum so that the bottom electrode 160 has a thickness of between about 0.1 μm and 1.0 μm. Preferably, the bottom electrode 160 is formed by using platinum-tantalum to have a thickness of about 0.15 μm.

A second layer 164 is formed on the bottom electrode 160 and on the second photo resist 157. The second layer 164 is formed by sol-gel method, sputtering method or CVD method so that the second layer 164 has a thickness of between about 0.1 μm and 1.0 μm. The second layer 164 is formed by using piezoelectric material such as PZT (Pb(Zr, Ti)O$_3$) or PLZT ((Pb, La)(Zr, Ti)O$_3$) or electrostrictive material such as PMN (Pb(Mg, Nb)O$_3$). Preferably, the second layer 164 is formed by sputtering method and by using the PZT produced by the sol-gel method to have a thickness of about 0.4 μm. Successively, the second layer 164 is annealed by RTA method. The second layer 164 will be patterned so as to form the active layer 165.

A top electrode layer 169 is formed on the second layer 164. The top electrode layer 169 is formed by using a material having conductivity such as aluminum, platinum, tantalum or platinum-tantalum. The top electrode layer 169 is formed by CVD method or sputtering method so that the top electrode layer 169 has a thickness of between about 0.1 μm and 1.0 μm. The top electrode layer 169 will be patterned so as to form the top electrode 170 which receives the second signal.

Figure 9C:
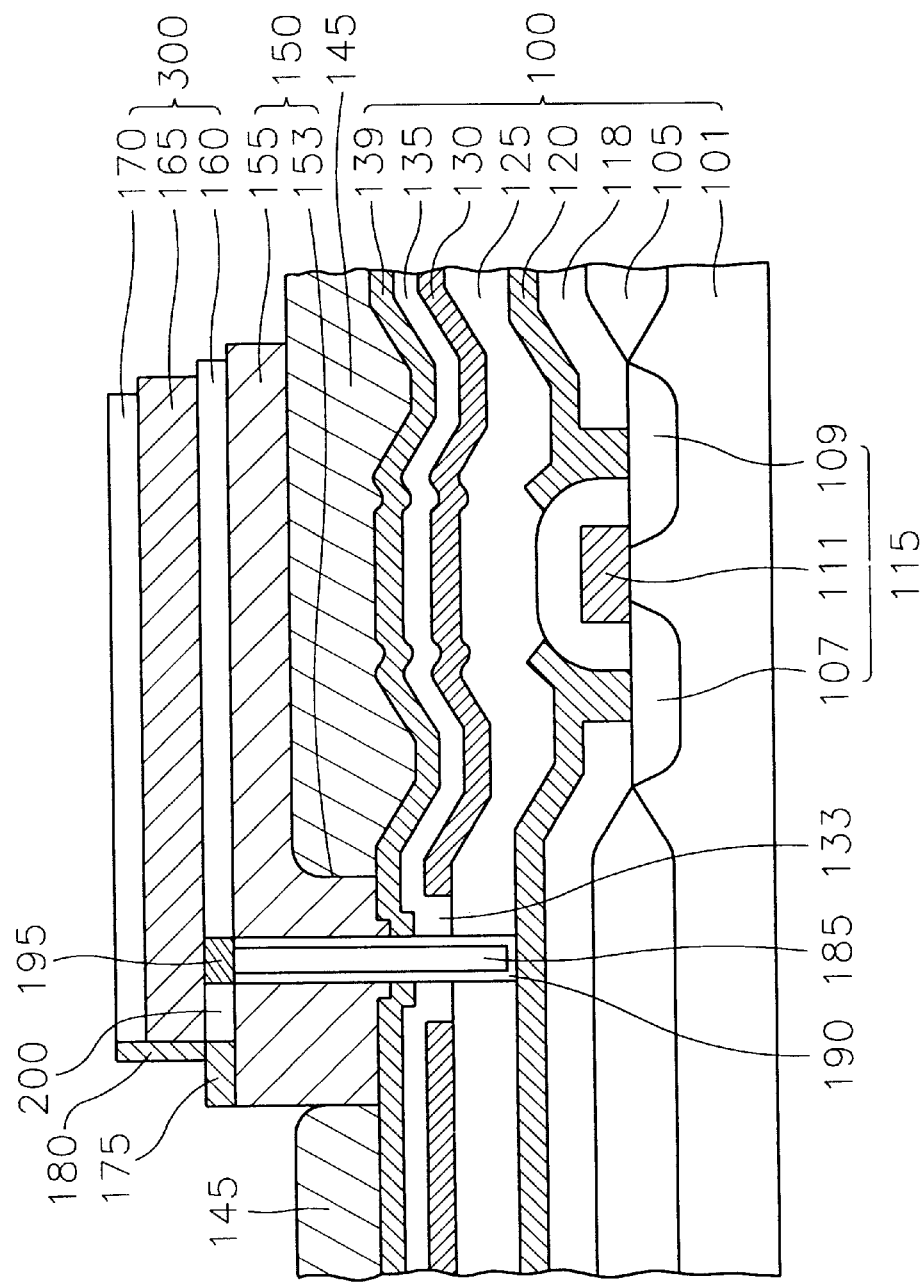

Referring to FIG. 9C, after a third photo resist (not shown) is coated on the top electrode layer 169 by spin coating method, the top electrode layer 169 is patterned by using the third photo resist as an etching mask so as to form the top electrode 170 having the rectangular shape. The second layer 164 is patterned by using the same method as that of patterning the top electrode layer 169 so that the active layer 165 is formed. That is, a fourth photo resist (not shown) is coated on the top electrode 170 and on the second layer 164 by spin coating method after the third photo resist is removed by etching. The second layer 164 is patterned by using the fourth photo resist as an etching mask so that the active layer 165 having the rectangular shape wilder than the top electrode 170 is formed. At this time, the active layer 165 has the rectangular shape smaller than the bottom electrode 160 formed previously. Then, the fourth photo resist and the second photo resist 157 is removed. In this case, the top electrode 170 and the active layer 165 respectively have protruding portions each of which parallely protrudes above the bottom electrode 160. A second air gap 200 is interposed between a side of the first bottom electrode 160 and the protruding portions of the top electrode 170 and the active layer 165.

The first layer 149 is patterned by using the above-described method so as to form the supporting member 150 having the anchor 153 and the supporting layer 155. The supporting layer 155 has the T shape and the bottom electrode 160 is formed the central portion of the supporting layer 155. The anchor 153 is integrally formed with the supporting layer 155 and is formed between the exposed portion of the etching stop layer 139 and the first portion of the supporting layer 155.

Subsequently, the common line 175 is formed on a portion of the first portion of the supporting layer 155. Namely, after a fifth photo resist (not shown) is coated on the supporting layer 155 by spin coating method, the fifth photo resist is patterned to expose the portion of the first portion of the supporting layer 155. Then, the common line 175 is formed by using platinum, tantalum, platinum-tantalum, aluminum or silver. The common line 175 is formed by sputtering method or CVD method so that the common line 175 has a thickness of between about 0.5 μm and 2.0 μm. In this case, the common line 175 is apart from the bottom electrode 160 by a predetermined interval. The second air gap 200 is interposed between the common line 175 and the side of the bottom electrode 160. Then, the top electrode connecting member 180 is formed from the common line 175 to the protruding portion of the top electrode 170. Hence, the top electrode connecting member 180 also apart from the bottom electrode by the predetermined interval. The top electrode connecting member 180 is formed by using the same material that of the common line 175 and by the same method that of the common line 175.

When the fifth photo resist is patterned, the portion of the first portion of the supporting layer 155 is exposed from the portion having the drain pad formed thereunder to the bottom electrode 160 is simultaneously exposed. Successively, the via hole 185 is formed by etching from a portion of the supporting layer 155 to the drain pad through the etching stop layer 139, the second passivation layer 135 and the first passivation layer 125. The via contact 190 is formed in the via hole 185 from the drain pad to the supporting layer 155. At the same time, the bottom electrode connecting member 195 is formed for connecting the via contact 190 to the bottom electrode 160. The bottom electrode connecting member 195 is formed from the via contact 190 to the bottom electrode 160. The via contact 190 and the bottom electrode connecting member 195 are formed by using a material having conductivity such as platinum, tantalum or platinum-tantalum and by sputtering method or CVD method. The bottom electrode connecting member 195 has a thickness of between about 0.5 μm and 1.0 μm. Therefore, the via contact 190, the bottom electrode connecting member 195 and the bottom electrode 160 are connected one after another. Then, the fifth photo resist is removed by etching so as to complete the actuator 300 having the top electrode 170, the active layer 165 and the bottom electrode 160.

Referring to FIG. 9D, a second sacrificial layer 215 is formed on the actuator 300 by using amorphous silicon or poly silicon. The second sacrificial layer 215 is formed by LPCVD method. At that time, the second sacrificial layer 215 has a sufficient thickness to cover the top electrode 170. The manufacturing step of the second sacrificial layer 215 is the same as that of the first sacrificial layer 145. That is, when the second sacrificial layer 215 is formed by using the amorphous silicon, it is no need to planarize the surface of the second sacrificial layer 215 because the amorphous silicon has an even surface during depositing the amorphous silicon. Hence, after the amorphous silicon is deposited by the LPCVD method to have a predetermined thickness, the step of forming the second sacrificial layer 215 is completed. On the other hand, when the second sacrificial layer 215 is formed by using the poly silicon, a step of planarizing the surface of the second sacrificial layer 215 is needed. Hence, after the poly silicon is deposited by the LPCVD method to have a thickness of between about 2.0 $\mu$m and 3.0 $\mu$m, the second sacrificial layer 215 is planarized by spin on glass method or chemical mechanical polishing (CMP) method so that the second sacrificial layer 215 has a predetermined thickness.

After a sixth photo resist (not shown) is coated on the second sacrificial layer 215 by spin coating method, the second sacrificial layer 215 is patterned so as to expose a portion of the top electrode 170 by using the sixth photo resist as an etching mask. In this case, the pattern of the second sacrificial layer 215 also has a gentle gradient like the first sacrificial layer 145 pattern by the same method as that of the first sacrificial layer 145.

Subsequently, the post 210 and the reflecting member 220 are simultaneously formed on the exposed portion of the top electrode 170 and on the second sacrificial layer 215 after the sixth photo resist is removed by etching. The post 210 and the reflecting member 220 are formed by using a metal having reflectivity such as aluminum, platinum or silver and by sputtering method or CVD method. Preferably, the reflecting member 220 is a mirror having a rectangular shape and has a thickness of between about 0.1 $\mu$m and 1.0 $\mu$m. The reflecting member 220 reflects the incident light from a light source (not shown). The post 210 has a gentle gradient such as the pattern of the second sacrificial layer 215 for preventing a crack generated from the edge of the post 210 because the stress concentrates at the edge of the post 210.

Then, the second sacrificial layer 215 and the first sacrificial layer 145 are respectively removed by using bromine fluoride ($BrF_3$ or $BrF_5$) vapor or xenon fluoride ($XeF_2$, $XeF_4$ or $XeF_6$) vapor. If the first sacrificial layer 145 and the second sacrificial layer 215 are removed by hydrogen fluoride vapor according to the conventional process, the active matrix 100, the active layer 165 and the reflecting member 220 may be seriously damaged because the active matrix 100, the active layer 165 and the reflecting member 220 are easily etched by the hydrogen fluoride vapor. However, the bromine fluoride vapor or the xenon fluoride vapor doesn't hurt the active matrix 100, the active layer 165 and the reflecting member 220, so the damages of the active matrix 100, the active layer 165 and the reflecting member 220 are effectively prevented.

A third air gap 230 is formed at the position where the second sacrificial layer 215 is located and the first air gap 140 is formed at the position where the first sacrificial layer 145 is located.

The operation of the thin film AMA in an optical projection system according to the present embodiment will be described.

The first signal is applied from outside to the first bottom electrode 160 via the MOS transistor 115, the drain pad of the first metal layer 120, the via contact 190 and the bottom electrode connecting member 195. At the same time, when the second signal is applied from outside to the top electrode 170 via the common line 175 and the top electrode connecting member 180, an electric field is generated between the top electrode 170 and the bottom electrode 160. The active layer 165 formed between the top electrode 170 and the bottom electrode 160 is deformed by the electric field. The active layer 165 is deformed in the direction perpendicular to the electric field. Hence, the actuator 300 having the active layer 165 is actuated in the opponent direction to the position where the supporting layer 155 is located. That is, the actuator 300 is actuated upward by a predetermined angle.

The reflecting member 220 reflecting the light is tilted by the same angle of the actuator 300. Therefore, the reflecting member 220 reflects the light onto a screen, so the picture is projected on the screen.

In the method for manufacturing thin film actuated mirror array according to the present embodiment, the light efficiency is enhanced by the reflecting member having an even surface after the first sacrificial layer and the second sacrificial layer are respectively formed by the amorphous silicon or the poly silicon in order to have even surfaces. In addition, the active matrix, the active layer and the reflecting member have no damages because the first sacrificial layer and the second sacrificial layer are removed by using the bromine fluoride vapor or the xenon fluoride vapor.

Embodiment 2

A thin film AMA according to a second embodiment of the present invention is the same as that of the first embodiment of the present invention as shown in FIGS. 6 to 8.

In a method for manufacturing the thin film AMA according to the present embodiment, manufacturing steps of the thin film AMA are the same as those of the first embodiment of the present invention as shown in FIGS. 9A to 9D except forming a first sacrificial layer and a second sacrificial layer.

The manufacturing steps of the first and the second sacrificial layers according to the present embodiment will be described as follows.

Figure 10:
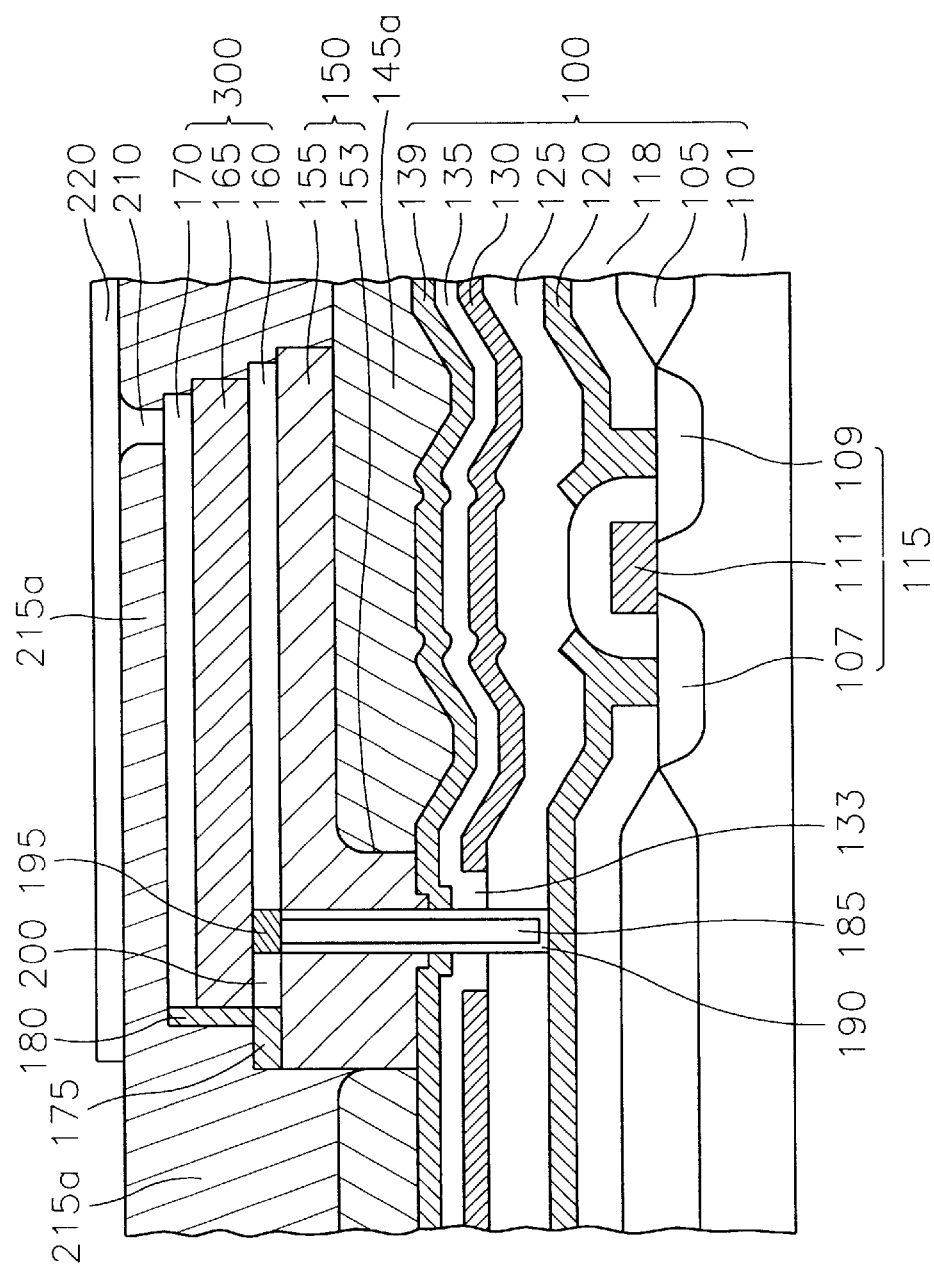
FIG. 10 illustrates the manufacturing step of the thin film actuated mirror array in an optical projection system according to a second embodiment of the present invention.

FIG. 10 illustrates the state in which the first and the second sacrificial layers are formed. In FIG. 10, the same reference numerals are used for the same elements in FIGS. 7 and 8.

Referring to FIG. 10, according to the present embodiment, the first sacrificial layer 145$a$ is formed by using amorphous silicon or poly silicon and by LPCVD method at a temperature of below 600° C. When the first sacrificial layer 145$a$ by using the amorphous silicon, it is no need to planarize the surface of the first sacrificial layer 145$a$ because the amorphous silicon has an even surface. Hence, after the amorphous silicon is deposited by the LPCVD method to have a thickness of about 1.0 $\mu$m, the step of forming the first sacrificial layer 145$a$ is completed. However, a step of planarizing the surface of the first sacrificial layer 145$a$ is needed when first sacrificial layer 145$a$ is formed by using the poly silicon since the poly silicon has an uneven surface. That is, after the poly silicon is deposited by the LPCVD method to have a thickness of between about 2.0 $\mu$m and 3.0 $\mu$m, the first sacrificial layer 145$a$ is planarized by using spin on glass method or by CMP method to have a thickness of about 1.0 $\mu$m.

The second sacrificial layer 215$a$ is formed by using a material having a superior fluidity such as photo resist, spin on glass (SOG) or spin on polymer (SOP) according to the present embodiment. The second sacrificial layer 215a has an even surface without a planarizing step because the second sacrificial layer 215a is formed by using the photo resist, the spin on glass (SOG) or the spin on polymer (SOP) and by spin coating method at low temperature.

In the present embodiment, the second sacrificial layer 215a is removed by using oxygen ($O_2$) plasma so as to avoid the damage of the reflecting member 220 and the active layer 165. The first sacrificial layer 145a is removed by using the bromine fluoride vapor or the xenon fluoride vapor like the first embodiment.

In the method for manufacturing thin film AMA according to the present embodiment, the light efficiency also is enhanced by the reflecting member having an even surface after the first sacrificial layer is formed by the amorphous silicon or the poly silicon and the second sacrificial layer is formed by the photo resist, the spin on glass (SOG) or the spin on polymer (SOP) in order to have even surfaces. In addition, the active matrix, the active layer and the reflecting member have no damages because the second sacrificial layer is removed by using the oxygen plasma and the first sacrificial layer is removed by using the bromine fluoride vapor or the xenon fluoride vapor.

While the present invention has been particularly shown and described with reference to particular embodiments thereof, it will be understood by those skilled in the art that various changes in form and detail may be effected therein without departing from the spirit and scope of the invention as defined by the appended claims.

What is claimed is:

1. A method for manufacturing a thin film actuated mirror array in an optical projection system, said method comprising the steps of:

providing an active matrix having i) a substrate including a metal oxide semiconductor transistor therein for a switching operation and ii) a first metal layer including a drain pad prolonged from a drain of the metal oxide semiconductor transistor, the active matrix being formed by a) forming a first passivation layer on said substrate and on said first metal layer, b) forming a second metal layer on said first passivation layer, c) forming a second passivation layer on said second metal layer and d) forming an etching stop layer on said second passivation layer:

forming a first sacrificial layer on said active matrix by a low pressure chemical vapor deposition method, the first sacrificial layer being comprised of at least one of an amorphous silicon and a poly silicon;

forming a supporting means having an anchor and a supporting layer after patterning said first sacrificial layer to expose a portion of said active matrix having the drain pad;

forming an actuator on said supporting means, said actuator having a bottom electrode, an active layer and a top electrode;

forming a second sacrificial layer on said actuator, the second sacrificial layer being comprised of at least one of an amorphous silicon and a poly silicon;

patterning said second sacrificial layer to expose a portion of said top electrode;

forming a post and a reflecting means on the exposed portion of said top electrode and on said second sacrificial layer;

removing said second sacrificial layer; and removing said first sacrificial layer.

2. The method for manufacturing the thin film actuated mirror array in an optical projection system as claimed in claim 1, wherein the steps of removing said second sacrificial layer and removing said first sacrificial layer are performed by using at least one of a bromine fluoride vapor and a xenon fluoride vapor.

3. The method for manufacturing the thin film actuated mirror array in an optical projection system as claimed in claim 1, the step of forming said first sacrificial layer further comprising planarizing said first sacrificial layer by a chemical mechanical polishing method and the step of forming said second sacrificial layer further comprising planarizing said second sacrificial layer by a chemical mechanical polishing method.

4. The method for manufacturing the thin film actuated mirror array in an optical projection system as claimed in claim 1, wherein the steps of removing said second sacrificial layer and removing said first sacrificial layer are performed by using at least one of a bromine fluoride vapor and a xenon fluoride vapor.

5. The method for manufacturing the thin film actuated mirror array in an optical projection system as claimed in claim 1, wherein the step of forming said second sacrificial layer is performed by using a material having fluidity and by a spin coating method.

6. The method for manufacturing the thin film actuated mirror array in an optical projection system as claimed in claim 5, wherein the step of forming said second sacrificial layer is performed by using a material selected from the group consisting of a photo resist, a spin on glass (SOG) and a spin on polymer (SOP).

7. The method for manufacturing the thin film actuated mirror array in an optical projection system as claimed in claim 5, wherein the step of removing said second sacrificial layer is performed by using an oxygen plasma and the step of removing said first sacrificial layer is performed by using at least one of a bromine fluoride vapor and a xenon fluoride vapor.

8. The method for manufacturing the thin film actuated mirror array in an optical projection system as claimed in claim 1, wherein the steps of removing said second sacrificial layer and removing said first sacrificial layer are simultaneously performed.

9. A method for manufacturing a thin film actuated mirror array in an optical projection system, said method comprising the steps of:

providing an active matrix having i) a substrate including a metal oxide semiconductor transistor therein for a switching operation and ii) a first metal layer including a drain pad prolonged from a drain of the metal oxide semiconductor transistor;

forming a first sacrificial layer on said active matrix by using an amorphous silicon and by a low pressure chemical vapor deposition method;

forming a supporting means having an anchor and a supporting layer after patterning said first sacrificial layer to expose a portion of said active matrix having the drain pad;

forming an actuator on said supporting means, said actuator having a bottom electrode, an active layer and a top electrode;

forming a second sacrificial layer on said actuator by using a material selected from the group consisting of a photo resist, a spin on glass (SOG) and a spin on polymer (SOP), the second sacrificial layer being comprised of amorphous silicon;

patterning said second sacrificial layer to expose a portion of said top electrode;

forming a post and a reflecting means on the exposed portion of said top electrode and on said second sacrificial layer;

removing said second sacrificial layer by using an oxygen plasma, the second sacrificial layer being removed by using at least one of a bromine fluoride and a xenon fluoride; and removing said first sacrificial layer, the first sacrificial layer being removed by using at least one of a bromine fluoride vapor and a xenon fluoride vapor.

10. A method for manufacturing a thin film actuated mirror array in an optical projection system, said method comprising the steps of:

providing an active matrix having i) a substrate including a metal oxide semiconductor transistor therein for a switching operation and ii) a first metal layer including a drain pad prolonged from a drain of the metal oxide semiconductor transistor;

forming a first sacrificial layer on said active matrix by using a poly silicon and by a low pressure chemical vapor deposition method;

forming a supporting means having an anchor and a supporting layer after patterning said first sacrificial layer to expose a portion of said active matrix having the drain pad;

forming an actuator on said supporting means, said actuator having a bottom electrode, an active layer and a top electrode;

forming a second sacrificial layer on said actuator by using a material selected from the group consisting of a photo resist, a spin on glass (SOG) and a spin on polymer (SOP), the second sacrificial layer being comprised of poly silicon;

patterning said second sacrificial layer to expose a portion of said top electrode;

forming a post and a reflecting means on the exposed portion of said top electrode and on said second sacrificial layer;

removing said second sacrificial layer by using an oxygen plasma, the second sacrificial layer being removed by using at least one of a bromine fluoride and a xenon fluoride; and removing said first sacrificial layer, the first sacrificial layer being removed by using at least one of a bromine fluoride vapor and a xenon fluoride vapor.

11. The method for manufacturing the thin film actuated mirror array in an optical projection system as claimed in claim 10, the step of forming said first sacrificial layer further comprising planarizing said first sacrificial layer by a chemical mechanical polishing method and the step of forming said second sacrificial layer further comprising planarizing said second sacrificial layer by a chemical mechanical polishing method.

* * * * *